Jan. 29, 1946.  C. A. WEISE  2,393,945
LATCH
Filed June 12, 1944
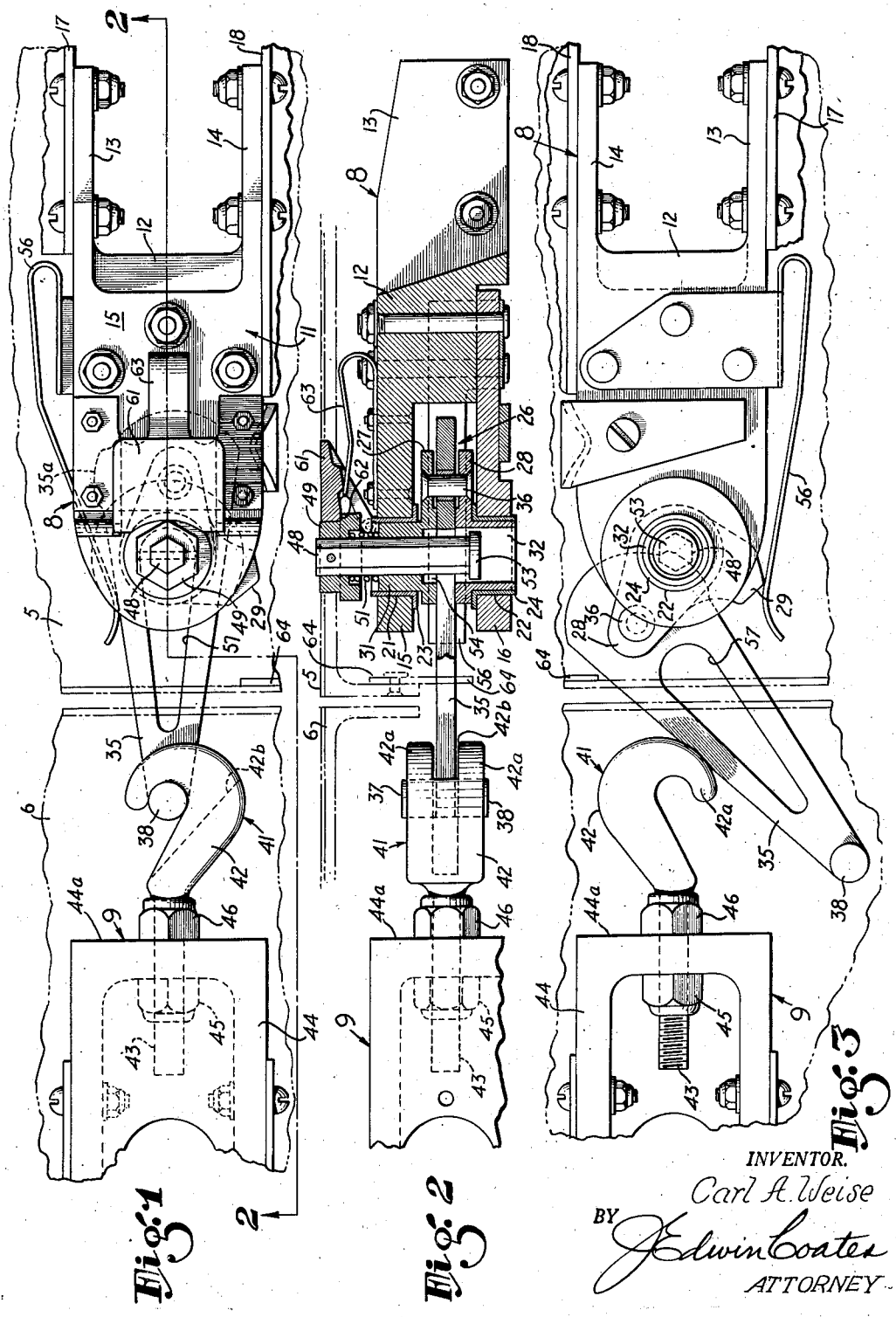
INVENTOR.
Carl A. Weise
BY
J. Edwin Coates
ATTORNEY Patented Jan. 29, 1946

2,393,945

UNITED STATES PATENT OFFICE 2,393,945

LATCH

Carl A. Weise, Los Angeles, Calif., assignor to Douglas Aircraft Company, Inc., Santa Monica, Calif.

Application June 12, 1944, Serial No. 539,983

12 Claims. (Cl. 292—64)

The present invention relates to latch mechanism of the type generally used to fasten airplane cowling.

Because of the tremendous vibration of the engine and the strong pressure of the air in advancing the plane at high speeds a great strain is imposed on the cowling and other parts. Sometimes under service conditions, especially when a plane has been subjected to a severe test, the cowling latch has become disengaged allowing the cowling to fall out of place. If this occurs while the plane is traveling at a high rate of speed, the loosened member is either thrown into the propeller disabling it for further use, or it is carried back by the force of the air current and frequently causes injury to the pilot or damage to the rudder or other control surfaces at the rear of the plane. A feature which greatly complicates the construction of this part of the plane is that the cowling must be readily demountable for servicing the parts enclosed thereby.

It is therefore an object of the invention to provide a latch that is strong and positive in action such that it will not become loosened by vibration or any other cause while the plane is in motion and at the same time is so constructed that it may be easily and quickly manipulated to remove the cowling when it is necessary to service the plane.

A further object of the invention is to provide a design of latch, which, when closed in locking position, will present no projections which extend beyond the outer skin of the cowling.

Still another object is to provide a latch which can be operated entirely from the outside of the cowling, automatically engaging the mating part when the operating member is moved, without the necessity of reaching inside the cowling with fingers or tools.

Other objects and advantages of my invention will be apparent to those skilled in the art after a consideration of the following detailed description, taken in conjunction with the accompanying drawing, wherein:

Figure 1 is a top plan view of my improved latch showing it applied to an airplane cowling and with the parts in the process of being connected together;

Figure 2 is a side elevational view of the structure shown in Figure 1 with the fastening brackets 17 and 18 not shown; and Figure 3 is a bottom plan view similar to Figure 1 but with the latch members disengaged.

Referring now to the drawing, the cowling sections or sheets to be connected together are indicated by numerals 5 and 6. The general construction of an airplane cowling is well known in the art and a more detailed showing is therefore unnecessary.

The latch mechanism comprises a fastening element 8 and a hook member 9. The fastening element 8 comprises a bracket or body 11 having a central transverse wall 12, spaced vertical side flanges 13 and 14 formed integrally with and extending perpendicularly outwardly from said wall 12 and a forked portion composed of a pair of horizontally disposed legs 15 and 16 rigidly related to the body 11 and extending perpendicularly inwardly from the wall 12. The flanges 13 and 14 are secured to bracket plates 17 and 18 respectively which are secured to and extend upwardly from a cowling sheet 5 shown in phantom lines in Figure 1. The leg 16 of the forked portion is detachable from the body 12 to facilitate assembly of the parts and the leg 15 may be integrally formed with the body as shown in the drawing. Aligned holes 21 and 22 are provided in the legs 15 and 16 adjacent the forward ends thereof and into these holes are fitted bushings 23 and 24. A double throw crank 26 is provided between the legs 15 and 16. Crank 26 includes a pair of vertically spaced arms 27 and 28 which are held in spaced relation by a bridge 29. Trunnions 31 and 32 are fixed on the arms 27 and 28 respectively and are journaled in the bushings 23 and 24.

A latching element in the form of a bar or link 35 is disposed between the spaced arms 27 and 28 of the crank 26 and is pivotally attached to the arms by a pivot pin 36 which extends through aligned openings in the forward ends of the arms 27 and 28 and the rear end of link 35. The latching link 35 extends forwardly and a pair of axially aligned cylindrical lugs or pins 37 and 38 are disposed at its forward end at opposite sides thereof. The latching link 35 extends beyond the end of cowling sheet 5 and its lugs 37 and 38 engage an anchorage element in the form of a bifurcated hook 41 fixed on member 9. A spring 56 normally urges the link 35 toward hook 41. The hook 41 includes a head 42 having spaced apart side members 42a and a central recess 42b. A threaded shank or stem 43 is formed integral with the head 42 and is adjustably supported in a supporting block 44 which is rigidly secured to a cowling sheet 6. The hook 41 is longitudinally adjustably related to the block 44 by lock nuts 45 and 46 on stem 43 which bear against opposite faces of the cross wall 44a of block 44.

To secure the sheets 5 and 6 in locked relation the lugs 37 and 38 are hooked over the members 42a of the head 42, the centrally disposed latching link 35 entering the recess 42b. The latching link 35 is then moved inwardly within the throat between the legs 15 and 16 of the bracket 11 serving to draw the sheets 5 and 6 together. To accomplish this movement of the latching link 35, a hexagonal shaft or plunger 48 is provided in a similarly shaped axial aperture in trunnion 31. The shaft 48 extends outwardly beyond the end of the trunnion 31 and a hex knob 49 is pinned on the outer end of the shaft. The shaft 48 is normally urged outwardly by a spring 51 which is provided on the shaft 48 between the outer end of the trunnion 31 and the nut 49. The shaft 48 is restrained from pulling out of the trunnion 31 by a collar 53 fixed on the inner end of the shaft, seating in a recess 54 provided in the trunnion 31.

The shaft 48 is rotated in a clockwise direction to engage link 35 with hook 41 and to move latching link 35 inwardly of the forked portion of bracket 11 by means of a wrench or similar tool applied to the nut 49. When the latching link 35 is in the locking position it is slightly over center. Spring 56 moves into engagement with cam surface 35a on link 35 toward the pivoted end thereof when the latching link is moved into fully unlatched position and serves to maintain it in open position. After the latching link 35 has been moved into locking position, it is secured therein by pushing the hex shaft 48 inward, the inner end passing through an opening 57 in the latching link 35. The shaft 48 is secured in locking position by a safety catch dog 61 which is pivotally mounted on the leg 15 and engages over a shoulder 62 formed on the nut 49 just below the flat sided hex outer end thereof. The safety catch 61 is forced into locking position by a flat spring 63 which is mounted on the leg 15 and contacts the under side of the catch dog 61. The bridge 29 abuts and restrains the latching link 35 from continued rotative motion after the arm has passed over center.

The operation of the latch mechanism will be apparent from the above description. Starting with the parts of the mechanism in the position shown in Figure 3, when the cowling sections are to be connected, the latching link 35 is swung upwardly by rotating the hex nut 49 in a counter clockwise direction as viewed in Figure 3, the pivot pin 36 forcing the right end of the latching link downwardly and forwardly and forcing the cam lug 35a against the spring 56 rocking the free end of the link under the action of the spring upwardly into the opening of the hook 41. Continued rotation of the nut 49 moves the lugs 37 and 38 forward into hooked relation with the hook 41. The nut 49 is then further rotated to draw the arm 35 back into the forked portion of latch member 8. When the cowl sections 5 and 6 are drawn tightly together, the latching link 35 has passed over center and is prevented from rotating further by coming in contact with the inner face of bridge 29. The proper relationship of the parts to give this result is obtained by adjustment of the nuts 45 and 46 on the threaded shank 43 of the hook 41. The latching link 35 is then locked in this over-center position by depressing the hex shaft 48 through the opening 57 in the latching link 35 securing it in depressed position by latching the safety catch dog 61 over the shoulder 62 on the hex nut 49. To release the latch mechanism the catch dog 61 is manually depressed against the spring 63 until it slips off the shoulder 62 permitting the spring 51 to elevate the nut 49 and shaft 48 from locking to release position. The underside of link 35 engages against the stop 64 mounted on the part 5 during the latter portion of the forward movement of link 35 in order to positively raise the link, and retain it in position to clear hook 41 when cowling section 6 is withdrawn, after the latch has been opened, to permit ready access to the engine. When the cowling section 6 is replaced and the hex rod 48 is rotated counter-clockwise to again lock the latch, link 35 is moved away from the stop 64 and its free end re-enters the hook 41.

This arrangement provides a positive lock for securing the cowl sections in operating position and one which cannot be jarred open by vibration of the engine or by the strong air pressure to which the latch is subjected.

While I have described, in connection with the accompanying drawing, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

I claim:

1. A latching mechanism for securely holding a part in a desired relation to another part in a structure comprising: an anchorage member carried by one part and formed as a bifurcated hook; a latch housing carried by the other part; a double armed crank member mounted for rotatory movement in said latch housing and having hollow co-axial trunnions formed on the axis of rotation of said crank member; an operating spindle mounted in a hollow trunnion of said crank and keyed thereto to permit longitudinal movement of said spindle but to hold said spindle against rotational movement relative to said hollow trunnion; resilient means tending to cause longitudinal movement of said spindle relatively to said trunnion; a stop formed on said spindle to limit the longitudinal movement thereof; a manually releasable pivoted spring pressed plate engaging over a projection on said spindle when said spindle is depressed against the effort of said resilient means whereby said spindle may be held nested in said hollow trunnion against the effort of said resilient means; a bridge piece connecting the arms of said double armed crank and serving as a stop; a latch member formed as a bar arranged between the arms of said double armed crank and pivoted at one end on the crank pin of said crank and with its free end formed to provide a cross bar to engage with said anchorage member; an enlargement formed around the periphery of said latch member at its pivoted end and an aperture formed in said latch member whereby said spindle is prevented from longitudinal movement in one direction in said hollow trunnion until said aperture has been brought into alignment with said hollow trunnion, the arrangement of parts being such that the pivotal connection of the crank and latch is slightly over center when in fully latched position at which time the bridge piece arrests further movement of the latch and crank, enabling the spindle to be depressed into engagement with the latch to lock the latch in closed position and to give a visual indication that the latching mechanism is properly closed and locked; and a spring acting constantly to urge the free end of said latch into engagement with the bifurcated hook member except when the latch is in the fully open position.

2. A latching mechanism for securely holding a part in a desired relation to another part in a structure comprising: an anchorage member carried by one part; a latch housing carried by the other part; a double armed crank member mounted for rotatory movement in said latch housing and having hollow co-axial trunnions formed on the axis of rotation of said crank member; an operating spindle mounted in a hollow trunnion of said crank and keyed thereto to permit longitudinal movement of said spindle but to hold said spindle against rotational movement relatively to said hollow trunnion; resilient means tending to cause longitudinal movement of said spindle relatively to said trunnion; a stop formed on said spindle to limit the longitudinal movement thereof; a manually releasable pivoted spring pressed plate engaging over a projection on said spindle when said spindle is depressed against the effort of said resilient means, whereby said spindle may be held nested in said hollow trunnion against the effort of said resilient means; a latch member formed as a bar arranged between the arms of said double armed crank and pivoted at one end of the crank pin of said crank and with its free end formed to engage with said anchorage member; an enlargement formed around the periphery of said latch member at its pivoted end and an aperture formed in said latch member whereby said spindle is prevented from longitudinal movement in one direction in said hollow trunnion until said aperture has been brought into alignment with said hollow trunnion, the arrangement of parts being such that the pivotal connection of the crank and latch is slightly over center when in fully latched position, enabling the spindle to be depressed into engagement with the latch to lock the latch in closed position and to give a visual indication that the latching mechanism is properly closed and locked; and a spring acting constantly to urge the free end of the latch into engagement with said anchorage member except when the latch is in fully open position.

3. A latching mechanism for securely holding a part in a desired relation to another part in a structure comprising: an anchorage member carried by one part; a latch housing carried by the other part; a double armed crank member mounted for rotatory movement in said latch housing and having hollow co-axial trunnions formed on the axis of rotation of said crank member; an operating spindle mounted in a hollow trunnion of said crank and keyed thereto to permit longitudinal movement of said spindle but to hold said spindle against rotational movement relatively to said hollow trunnion; resilient means tending to cause longitudinal movement of said spindle relatively to said trunnion; a stop formed on said spindle to limit the longitudinal movement thereof; a manually releasable pivoted spring pressed plate engaging over a projection on said spindle when said spindle is depressed, whereby said spindle may be held nested in said hollow trunnion against the effort of said resilient means; a latch member formed as a bar arranged between the arms of said double armed crank and pivoted at one end on the crank pin of said crank and with its free end formed to engage with said anchorage member; and a spring acting constantly to urge the free end of the latch into engagement with said anchorage member except when the latch is in fully open position.

4. A latching mechanism for securely holding a part in a desired relation to another part in a structure comprising: an anchorage member carried by one part; a latch housing carried by the other part; a crank member mounted for rotatory movement in said latch housing and having a hollow co-axial trunnion formed on the axis of rotation of said crank member; an operating spindle mounted in the hollow trunnion of said crank and keyed thereto to permit longitudinal movement of said spindle but to hold said spindle against rotational movement relatively to said hollow trunnion; resilient means tending to cause longitudinal movement of said spindle relatively to said trunnion; a stop formed on said spindle to limit the longitudinal movement thereof; a manually releasable pivoted spring pressed plate engaging over a projection on said spindle when said spindle is depressed against the action of said resilient means whereby said spindle may be held nested in said hollow trunnion against the effort of said resilient means; a latch member arranged to lie against said crank and pivoted at one end on the crank pin of said crank; an enlargement formed around the periphery of said latch member at its pivoted end and an aperture formed in said latch member whereby said spindle is prevented from longitudinal movement in one direction in said hollow trunnion until said aperture has been brought into alignment with said hollow trunnion, the arrangement of parts being such that the pivotal connection of the crank and latch is slightly over center when the parts are in fully latched position, enabling the spindle to be depressed into engagement with the latch to lock the latch in closed position and to give a visual indication that the latching mechanism is properly closed and locked; and a spring acting constantly to urge the free end of the latch into engagement with said anchorage member except when the latch is in fully open position.

5. A latching mechanism for securely holding a part in a desired relation to another part in a structure comprising: an anchorage member carried by one part; a latch housing carried by the other part; a crank member mounted for rotatory movement in said latch housing and having a hollow co-axial trunnion formed on the axis of rotation of said crank member; an operating spindle mounted in the hollow trunnion of said crank and keyed thereto to permit longitudinal movement of said spindle but to hold said spindle against rotational movement relatively to said hollow trunnion; resilient means tending to cause longitudinal movement of said spindle relatively to said trunnion; a stop formed on said spindle to limit the longitudinal movement thereof; a manually releasable pivoted spring pressed plate engaging over a projection on said spindle when said spindle is depressed against the effort of said resilient means, whereby said spindle may be held nested in said hollow trunnion against the effort of said resilient means; a latch member formed as a bar pivoted at one end on the crank pin of said crank and with its free end formed to engage with said anchorage member; an enlargement formed around the periphery of said latch member at its pivoted end and an aperture formed in said latch member whereby said spindle is prevented from longitudinal movement in one direction in said hollow trunnion until said aperture has been brought into alignment with said hollow trunnion, the arrangements of parts being such that the pivotal connection of the crank and latch is slightly over center when the parts are in fully latched position, enabling the spindle to be depressed into engagement with the latch to lock the latch in closed position and to give a visual indication that the latching mechanism is properly closed and locked; and resilient means acting to urge the latch toward the anchorage member except when the latch is in open position.

6. A latching mechanism for securely holding a part in a desired relation to another part in a structure comprising: an anchorage member carried by one part; a latch housing carried by the other part; a crank member mounted for rotatory movement in said latch housing and having a hollow coaxial trunnion formed on the axis of rotation of said crank member; an operating spindle mounted in the hollow trunnion of said crank and keyed thereto to permit longitudinal movement of said spindle but to hold said spindle against rotational movement relatively to said hollow trunnion; resilient means tending to cause longitudinal movement of said spindle relatively to said trunnion; a stop formed on said spindle to limit the longitudinal movement thereof; a manually releasable member adapted to engage over said spindle when said spindle is depressed against the effort of said spring whereby said spindle may be held nested in said hollow trunnion against the effort of said resilient means; a latch member pivoted at one end on the crank pin of said crank and with its free end formed to engage with said anchorage member; the arrangement of parts being such that the pivotal connection of the crank and latch is slightly over center when the parts are in fully latched position, enabling the spindle to be depressed into engagement with the latch to lock the latch in closed position and to give a visual indication that the latching mechanism is properly closed and locked; and resilient means acting to urge the latch toward said anchorage except when in open position.

7. Latching means for securely holding a part in a desired relation to another part in a structure, said means comprising: an anchorage carried by one part; a bracket carried by the other part; a latch element adapted to engage with said anchorage and mounted in said bracket for pivotal movement and for movement in a plane transverse to its pivotal axis toward and away from said anchorage; operating means for said latch element connected to said element for said pivotal movement and carried by said bracket and comprising a member mounted for rotational movement and for movement longitudinally of its axis of rotation and arranged in one longitudinal position to engage said element and lock it against said to and fro movement; means for retaining said operating means in said locking position; and resilient means acting to urge the latch toward said anchorage except when in open position.

8. Latching means for securely holding a part in a desired relation to another part in a structure, said means comprising: an anchorage carried by one part; a bracket carried by the other part; a latch element adapted to engage with said anchorage and mounted in said bracket for pivotal movement and for movement in a plane transverse to its pivotal axis toward and away from said anchorage; operating means for said latch element connected to said latch element for said pivotal movement and carried by said bracket and comprising a member mounted for rotational movement and for movement longitudinally of its axis of rotation and arranged in one longitudinal position to engage said latch element and lock it against said to and fro movement; cam means arranged on said latch adjacent the point of pivotal engagement of said latch with said operating means; resilient means engaging said latch element to maintain said element in position to engage said anchorage means except when disengaged therefrom by said operating means, said resilient means acting to hold the latch element in disengaged position until the operating means are again manipulated to engage said anchorage; said operating means and latch element being locked together in the fully latched position by moving said member comprised in the operating member longitudinally of the axis of rotation thereof; and means for retaining said longitudinally moved member in locked position until said means are released.

9. Latching mechanism as set forth in claim 1 and in addition comprising: resilient means acting to hold said latch when freed from said anchorage in position to clear said anchorage until the latch operating means are again manipulated to cause the latch to engage the anchorage.

10. Latching means for securely holding a part in a closed relation to another part in a structure, said means comprising: an anchorage carried by one part; a bracket carried by the other part; a latching bar disengageably connected to said anchorage and mounted on said bracket for movement away from and toward said anchorage to hold the parts in said closed relation or to release them respectively; a rotatable shaft mounted on said bracket for imparting said movement to said bar and connected to said bar to fix said bar in positions corresponding to its rotational positions; a plunger slidably keyed to said shaft and resiliently held to a limit position in one direction, and engageable with said bar, when moved in the other direction, to lock said bar against said to and fro movement when said bar is in said parts closing position, and to impart rotational movement to said shaft.

11. Latching means for securely but releasably holding a part against another part in a structure, said means comprising: an anchorage carried by one part; mounting means carried by said other part; a rotatable element carried by said mounting means; a latching bar pivoted on said rotatable element; a bar slidably but drivingly mounted in said rotatable element and operable by a rotative movement to rotate said member to cause said latching member to engage said anchorage, and to lock said latching member by axial movement in one direction; resilient means tending to project said bar from the position in which it acts to lock said latching bar into the position in which it is operable to rotate the rotatable element; and means whereby said bar may be held against the effort of said resilient means in position to lock said latching bar.

12. Latching means for securely but releasably holding a part against another part in a structure, said means comprising: an anchorage carried by one part; mounting means carried by said other part; a rotatable element carried by said mounting means; a latching bar pivoted on said rotatable element; a bar slidably but drivingly mounted in said rotatable element and operable by a rotative movement to rotate said member to cause said latching member to engage said anchorage and to lock said latching member by axial movement in one direction; resilient means tending to project said bar from the position in which it acts to lock said latching bar into the position in which it is operable to rotate the rotatable element; means whereby said bar may be held against the effort of said resilient means in position to lock said latching bar; resilient means tending to hold the latching bar in position to enter the anchorage; and a projection on one of the two parts adapted to be held together and positioned to engage against said latching bar toward the end of its unlatching movement and effective to raise and hold the latching member clear of said anchorage against the effort of said resilient means until the latching member is again moved toward locking position.

CARL A. WEISE.